United States Patent
Carlson et al.

(10) Patent No.: US 8,012,619 B2
(45) Date of Patent: Sep. 6, 2011

(54) ESTABLISHING SPACE BETWEEN END OF CENTER GAS PIPE IN BATTERY AND BOTTOM OF BATTERY CAN

(75) Inventors: Jeremy Robert Carlson, Cary, NC (US); Larry Glenn Estes, Durham, NC (US); Joseph Anthony Holung, Wake Forest, NC (US); Timothy Humphrey, Raleigh, NC (US); Tin-Lup Wong, Chapel Hill, NC (US); Bouziane Yebka, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 870 days.

(21) Appl. No.: 12/033,339

(22) Filed: Feb. 19, 2008

(65) Prior Publication Data

US 2009/0208823 A1 Aug. 20, 2009

(51) Int. Cl.
*H01M 2/12* (2006.01)
(52) U.S. Cl. .................. 429/82; 429/83; 429/88; 429/94
(58) Field of Classification Search .................... 429/82, 429/83, 88, 94
See application file for complete search history.

(56) References Cited

U.S. PATENT DOCUMENTS

2001/0036571 A1 * 11/2001 Oogami et al. .................. 429/94
2003/0148175 A1 * 8/2003 Iwanaga et al. ............... 429/130

* cited by examiner

*Primary Examiner* — Patrick Ryan
*Assistant Examiner* — Ben Lewis
(74) *Attorney, Agent, or Firm* — John L. Rogitz

(57) ABSTRACT

The gap between the bottom of a center gas vent pipe in a battery cell and the bottom of the cell can is established to be at least a minimum distance to reduce the risk of battery damage from inadequate gas venting.

18 Claims, 2 Drawing Sheets

ESTABLISHING SPACE BETWEEN END OF CENTER GAS PIPE IN BATTERY AND BOTTOM OF BATTERY CAN

I. FIELD OF THE INVENTION

The present invention relates generally to establishing a sufficient space between the end of a gas pipe in a rechargeable battery and the bottom of the battery can to reduce the risk of battery damage.

II. BACKGROUND OF THE INVENTION

Rechargeable batteries such as Lithium-ion batteries are used in a wide variety of electronics, including in notebook computers and wireless telephones. Lithium-ion batteries have the advantages of being low cost while having high energy storage capacity. Nonetheless, market forces create pressure to package ever more power storage capacity into existing batteries, and as this occurs, safety incidents such as cell explosion, cell rupture, or cell venting are on the rise.

SUMMARY OF THE INVENTION

We have discovered that inadequate venting of gas from battery electrodes formed in a so-called "jelly roll" configuration through a pipe can be the cause of cell damage including explosions, and furthermore we have found that inadequate venting can be caused by the bottom of the pipe being too close to the bottom of the cell can.

Accordingly, a battery has one or more battery cells. A cell of the battery has a gas vent pipe defining an open bottom into which gas can pass. A cell can holds the pipe within battery cell structure. A gap is established between the bottom of the pipe and the battery can to be at least a minimum distance to reduce the risk of battery damage from inadequate gas venting.

In some embodiments a flange can be engaged with a top segment of the pipe and oriented substantially perpendicular to the axis of the pipe. The flange rests on the cell structure. The flange may be made integrally with the pipe or separately therefrom. In other embodiments the flange engages the bottom of the pipe with cell structure.

The cell structure may include at least one electrode configured to be concentric with the pipe. The pipe can be cylindrical and can be coaxial with the can.

As set forth further below, the gap can be established to be at least a predetermined fraction of the diameter of the pipe. The fraction typically is less than one and may be no more than about one-third. Indeed, the fraction can be one quarter. The bottom periphery of the pipe may be scalloped and multiple pipes can be used.

In another aspect, a method includes disposing cell structure in a can having an inside bottom surfaces. The cell structure forms a cavity, and the method further includes disposing a pipe lengthwise in the cavity. The pipe has an open bottom end, and the method still further includes establishing at least a predetermined relationship between a first area and a second area orthogonal to the first area, the relationship ensuring adequate space exists for sufficient gas to enter the pipe.

In still another aspect, a method reduces the chance of battery damage from inadequate gas venting by ensuring that an open bottom end of a vent pipe is spaced from preselected cell structure by at least a predetermined distance.

In an aspect, an apparatus includes a system to be powered such as a computer, vehicle, or other system, and a battery electrically connected to the system to power electrical components thereof. The battery has one or more battery cells. A cell of the battery has a gas vent pipe defining an open bottom into which gas can pass. A cell can holds the pipe within battery cell structure. A gap is established between the bottom of the pipe and the battery can to be at least a minimum distance to reduce the risk of battery damage from inadequate gas venting.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
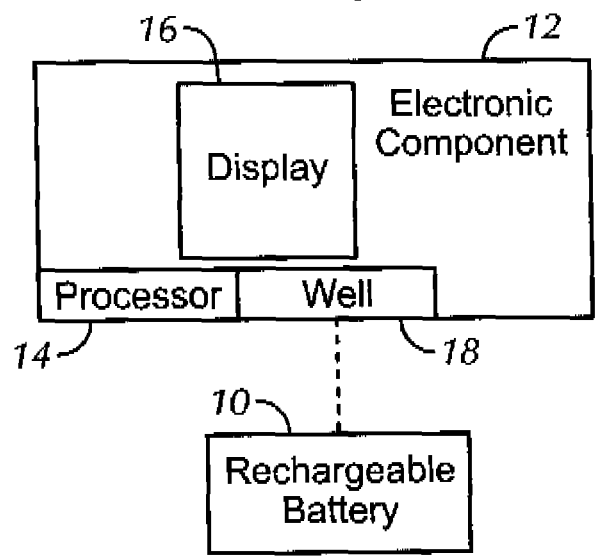
FIG. 1 is a block diagram of a non-limiting system in which a battery according to present principles can be used.

Referring initially to FIG. 1, a battery 10 that can incorporate one or more of the below-discussed battery cells may be removably engaged with an electronic component 12 such but not limited to a notebook computer, wireless telephones vehicle electric system, etc. to power internal parts thereof such as a processor 14, visual display 16, etc. Typically the battery 10 is engaged with a battery well or receptacle 18 of the component 12. The battery 10 may be rechargeable and may be a Lithium-ion battery.

Figure 2:
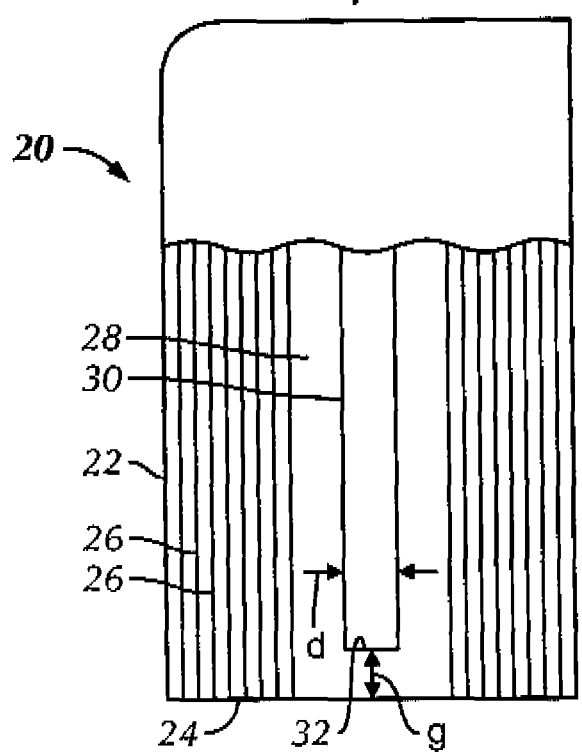
FIG. 2 is a schematic side elevational view of a battery cell with portions cut away for clarity.

FIG. 2 shows that a cell 20 of the battery 10 may include a hollow outer plastic or metal can 22 that has a closed bottom 24. The can 22 holds battery cell structure and in the non-limiting embodiment shown the cell structure includes one or more battery electrodes 26 formed in concentric cylinders as shown. The electrodes are concentric with the axis of the can 22 as shown and a hollow generally cylindrical central axial cavity 28 is formed within the annulus established by the electrodes 26.

A hollow gas vent pipe 30 is disposed in the axial cavity 28, preferably centrally therein. It is to be understood while space is shown between the pipe 30 and electrodes 26 for clarity, in practice typically little or no space exists radially between the pipe 30 and electrodes 26.

The pipe 30 may but not must be cylindrical. For instance, it could have a transverse cross-section that is elliptical, rectangular, prismatic, or some other non-circular shape and the same is true of the transverse cross-section of the electrodes 26, although typically both the electrodes 26 and pipe 30 are cylindrical. Also, the pipe 30 typically completely encloses an inside volume but in some embodiments such as, for example, when the pipe is made of a rolled piece of metal, a small axial gap may extend through the wall of the pipe.

The pipe has an open bottom end 32 facing the bottom 24 of the can 22 and an open top end, and gas generated within the cell can vent into the open bottom end 32 and out of the open top end of the pipe to relieve gas pressure in the cell and, hence, reduce the risk of explosion or other cell damage.

In the cylindrical embodiment shown the pipe 30 defines an inside diameter "d" and according to present principles, the open bottom end 32 of the pipe is spaced from the inside bottom surface of the can 22 by at least a predetermined distance or gap "g". By establishing this spacing, adequate area exists for battery gas to enter the pipe for venting.

More generally, the distance in the axial dimension (the dimension defined by the axis of the pipe 30) from the bottom end 32 of the pipe to the can 22 is established to establish a relationship between two mutually orthogonal areas which ensures adequate space exists for sufficient gas to enter the pipe. One area is the transverse cross-sectional area of the pipe, which consequently depends on at least one transverse dimensional parameter, in the case of a cylindrical pipe, the diameter "d" or, in the case of an elliptical pipe, the major and/or minor axis. The other area is the area enveloping the volumetric space directly below the bottom 32 of the pipe that extends to the can 22, i.e., the volumetric space that is enclosed by an imaginary projection of the wall of the pipe from the bottom of the pipe down to the can. Thus, this latter area depends on at least one axial dimension parameter. In the case of a cylindrical pipe, the axial dimension parameter is the gap "s", and this latter area also depends on a parameter in the transverse dimension of the pipe as well.

To illustrate, when the pipe is cylindrical, the first (transverse) area is given by $\frac{1}{4}*pi*d^2$ while the second area is given by $pi*d*s$, and the inverse of the ratio of the areas reduces, in the cylindrical case, to a constant multiplied by s/d. This relationship is established by establishing "s" for a given "d" such that $s/d \geq C$, where C is an empirically determined constant that ensures adequate gas venting.

Figure 3:
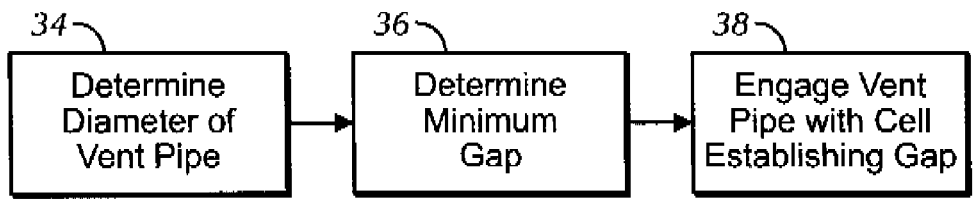
FIG. 3 is a flow chart of present non-limiting logic.

For illustration, the pipe 30 will be assumed to be cylindrical. FIG. 3 shows at block 34 that the inside diameter of the pipe 30 is determined, and then at block 36 that a minimum gap distance "g" determined. At block 38 the vent pipe 30 is engaged with the cell 20 in accordance with disclosure below such that the bottom 32 of the pipe 30 is ensured to be at least a distance "g" from the inside bottom surface of the can 22.

In one embodiment, the gap "g" is established to be at least a predetermined fraction of the diameter "d" of the pipe 30. The fraction typically is less than one and may be no more than about one-third. Indeed, the fraction can be one quarter. The relationship between "d" and "g" varies based on, e.g., viscosity and compressibility of the gas to be vented and cell geometry, and may be empirically determined by observing pipe spacing of plural cells using, e.g., X-rays and correlating various spacings to episodes of cell damage.

Figure 4:
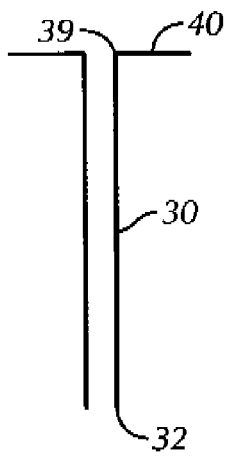
FIGS. 4-6 are alternate examples of how the pipe spacing can be established in the cell.
Figure 5:
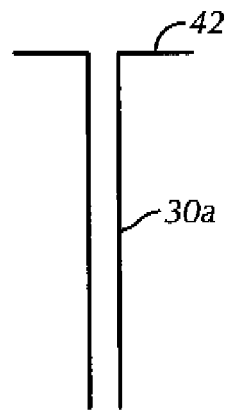
Figure 6:
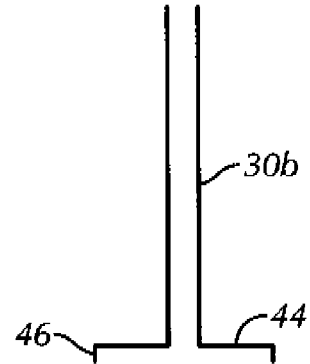

To ensure that the minimum gap "g" is established and maintained, various non-limiting approaches may be taken. FIGS. 4-6 illustrate three such approaches. In FIG. 4, at or near the open top end 39 of the pipe 30, a flange 40 may be engaged. The flange 40 may be a rubber washer that is orthogonal to the axis of the pipe 30 as shown and that can rest on top of, e.g., the electrodes 26 or other cell structure. The length of the pipe 30 is established such that when the flange 40 is engaged with the top of the pipe to rest on cell structure, the bottom 32 of the pipe is spaced by the predetermined distance of at least "g" from the bottom of the can shown in FIG. 2. Or, as shown in FIG. 5 a flange 42 may be made integrally with a pipe 30a near or at the top of the pipe by, e.g., rolling a lip or upsetting the top end of the pipe 30a. Still again, as shown in FIG. 6 a flange 44 can be engaged or formed at or near the bottom of a pipe 30b. In the embodiment of FIG. 6, the flange 44 is engaged with the bottom of the "jelly roll" at, e.g., the inner diameter of the jelly roll, and the flange 44 can include a vertically-oriented outer skirt 46 that establishes at least the predetermined minimum distance "g" between the bottom of the pipe 30b and the can. The skirt 46 may be perforated.

Figure 7:
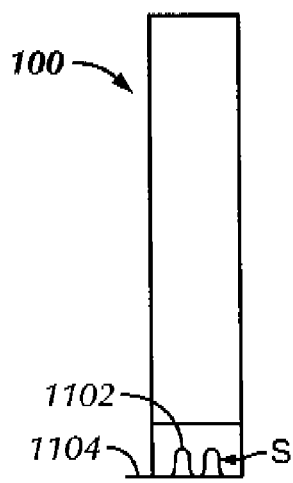
FIG. 7 shows an alternate pipe structure.

FIG. 7 shows a pipe 100 that has a scalloped bottom portion 102 defining a non-linear bottom periphery as shown, a portion of which rests on the bottom 104 of a battery can. Owing to the non-linear periphery the cylindrical wall of the pipe defines a cumulative open area "S" in the axial dimension. The ratio of the cumulative open axial area "S" to the transverse area of the pipe is established to be at least a predetermined ratio to ensure adequate gas can enter the pipe to vent.

Figure 8:
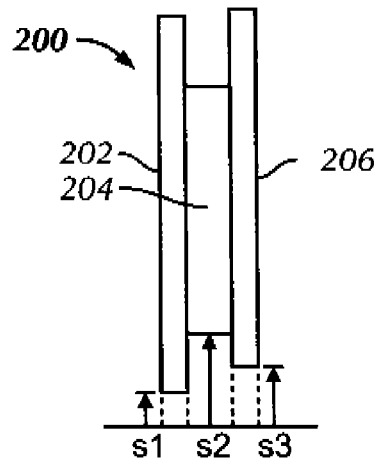
FIG. 8 shows another alternate pipe structure.

FIG. 8 shows that a pipe assembly 200 can have plural pipes 202, 204, 206 with respective open axial areas S1, S2, S3 established between the bottom of the pipes and the bottom of the can. The ratios of the axial areas S to the respective transverse areas of the pipes is established as above, empirically to ensure adequate space exists for gas to enter the pipes to vent.

While the particular ESTABLISHING SPACE BETWEEN END OF CENTER GAS PIPE IN BATTERY AND BOTTOM OF BATTERY CAN is herein shown and described in detail, it is to be understood that the subject matter which is encompassed by the present invention is limited only by the claims.

What is claimed is:

1. A battery, comprising:
   at least one battery cell having at least one gas vent pipe defining an open bottom into which gas can pass;
   at least one cell can holding the pipe within battery cell structure, a gap being established between at least a portion of a bottom periphery of the pipe and the battery can to reduce the risk of battery damage from inadequate gas venting;
   wherein the gap is established to be at least a predetermined fraction of a transverse dimension parameter of the pipe; and
   wherein the transverse dimension parameter is a diameter and the fraction is no more than one-third.

2. The battery of claim 1, comprising a flange engaged with a top segment of the pipe and oriented substantially perpendicular to the axis of the pipe, the flange resting on at least part of the cell structure.

3. The battery of claim 2, wherein the flange is made integrally with the pipe.

4. The battery of claim 1, wherein the cell structure includes at least one electrode configured to be concentric with the pipe.

5. The battery of claim 1, wherein the pipe is cylindrical and is coaxial with the can.

6. The battery of claim 1, wherein the pipe is not cylindrical.

7. The battery of claim 1, wherein the transverse dimension parameter is a diameter and the fraction is one quarter.

8. The battery of claim 1, wherein the bottom periphery is scalloped.

9. The battery of claim 1, comprising plural pipes.

10. Apparatus comprising:
    a system to be powered; and
    a battery electrically connected to the system to power electrical components thereof, the battery comprising:
    at least one battery cell having at least one gas vent pipe defining an open bottom into which gas can pass;
    at least one cell can holding the pipe within battery cell structure, a gap being established between at least a portion of a bottom periphery of the pipe and the battery can to reduce the risk of battery damage from inadequate gas venting;
    wherein the gap is established to be at least a predetermined fraction of a transverse dimension parameter of the pipe; and wherein the transverse dimension parameter is a diameter and the fraction is less than one.

11. The apparatus of claim 10, comprising a flange engaged with a top segment of the pipe and oriented substantially perpendicular to the axis of the pipe, the flange resting on at least part of the cell structure.

12. The apparatus of claim 11, wherein the flange is made integrally with the pipe.

13. The apparatus of claim 10, wherein the cell structure includes at least one electrode configured to be concentric with the pipe.

14. The apparatus of claim 10, wherein the pipe is cylindrical and is coaxial with the can.

15. The apparatus of claim 10, wherein the pipe is not cylindrical.

16. The apparatus of claim 10, wherein the transverse dimension parameter is a diameter and the fraction is one quarter.

17. The apparatus of claim 10, wherein the bottom periphery is scalloped.

18. The apparatus of claim 10, comprising plural pipes.

* * * * *